United States Patent [19]

Fritzsche et al.

[11] 3,760,830
[45] Sept. 25, 1973

[54] FLOW REGULATING VALVE FOR PRESSURE FLUIDS

[75] Inventors: Rudolf Fritzsche, Stuttgart-Feuerbach; Friedrich Wilhelm Höfer, Hofingen; Rudi Schmid, Stetten/Filder, all of Germany

[73] Assignee: Robert Bosch GmbH, Stuttgart, Germany

[22] Filed: Aug. 16, 1971

[21] Appl. No.: 176,361

[30] Foreign Application Priority Data

Aug. 17, 1970 Germany.................. P 20 40 728.7

[52] U.S. Cl........................ 137/101, 251/14, 251/60
[51] Int. Cl......................... G05d 11/02, F16k 31/12
[58] Field of Search................. 137/98, 100, 101, 137/117, 495, 501; 251/14, 251, 60

[56] References Cited
UNITED STATES PATENTS

| | | | |
|---|---|---|---|
| 2,312,549 | 3/1943 | Hiner.............................. | 251/251 X |
| 2,582,088 | 1/1952 | Walthers......................... | 137/501 X |
| 2,643,664 | 6/1953 | Willett............................. | 137/101 |
| 3,241,318 | 3/1966 | Rohde............................. | 137/101 X |
| 3,402,912 | 9/1968 | Watkins.......................... | 251/14 |
| 3,642,019 | 2/1972 | Kramer et al.................... | 137/101 |

*Primary Examiner*—William R. Cline
*Attorney*—Michael S. Striker

[57] ABSTRACT

A flow regulating valve for pressure fluids has a housing provided with an inlet and two outlets for pressure fluid. A slidable control member in the housing has differential pressure faces exposed to differential pressure in response to whose magnitude it divides a flow of fluid entering the inlet into a main and a secondary stream which are each channeled to one of the outlets. An adjustable throttling device is located in the housing and permits adjusting of the pressures acting upon the respective pressure faces, and an eccentric displaces the throttling device to various positions to obtain a desired setting. A pressure-fluid operated control arrangement is associated with the throttling device and can vary the once-selected setting of the latter independently of the manual setting of the eccentric and in dependence upon a control pressure governed by a reference value.

8 Claims, 2 Drawing Figures

FLOW REGULATING VALVE FOR PRESSURE FLUIDS

BACKGROUND OF THE INVENTION

The present invention relates generally to a valve, and more particularly to a flow regulating valve for pressure fluids.

It is already known to provide flow regulating valves for pressure fluids which separate the incoming stream of fluid into a controlled main flow for a first user and a secondary flow or stream for a second user. An adjustable throttling device is provided and an arrangement which permits adjustment of the valve to vary the magnitude of the main and secondary streams.

A valve of this type is known, for instance, from German Gebrauchsmuster 1,969,315. While it is fully operable for its intended purpose further improvements in this construction are desirable because this aforementioned valve, and others known from the art, permit only manual adjustment which in many instances may not be desired or many not be fully adequate for the needs of a given application.

SUMMARY OF THE INVENTION

It is, accordingly, an object of the present invention to provide a flow regulating valve which is not possessed of the disadvantages mentioned above.

More particularly it is an object of the present invention to provide an improved flow regulating valve for pressure fluids which can be controlled also in other ways than by manual adjustment.

In pursuance of the above objects, and of others which will become apparent hereafter, one feature of the invention resides in a flow regulating valve for pressure fluids which, briefly stated, comprises a housing having an inlet and two outlets for pressure fluid. A slidable control member is accommodated in the housing and has differential pressure faces exposed to differential pressures in response to whose magnitude it divides a flow of fluid entering the inlet into a main and a secondary stream which are each channeled to one of the outlets. Adjustable throttling means is provided in the housing for adjusting the pressures acting upon the pressure faces and operator-controlled varying means serve for varying the adjustment of the throttling means so as to obtain a desired setting. Further, and in accordance with the present invention, there is provided pressure-fluid operated control means associated with the throttling means and operative for varying the adjustment of the same independently of the respective manual setting in dependence upon a control pressure governed by a reference value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
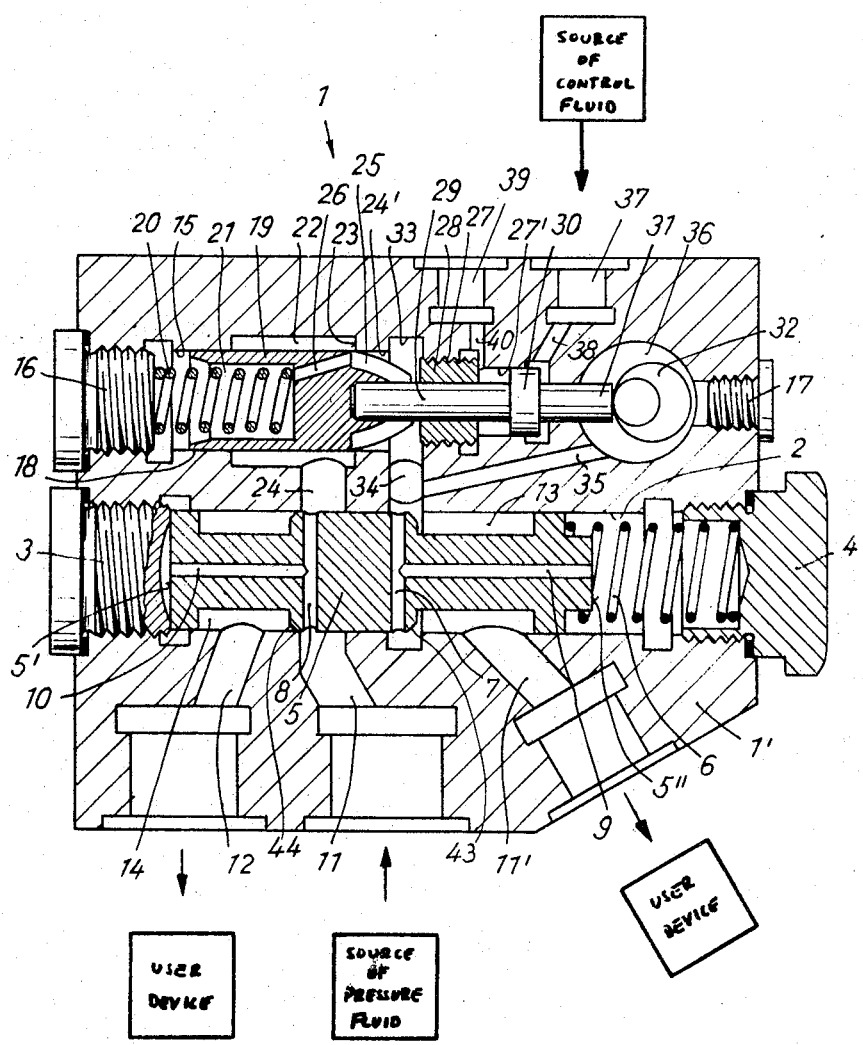
FIG. 1 is a longitudinal section through a flow regulating valve according to the present invention.

Discussing now the drawing in detail, and firstly FIG. 1, it will be seen that the flow regulating valve illustrated therein is generally identified with reference numeral 1 and has a housing 1' provided with a passage 2 the opposite open ends of which are closed by threaded plugs 3 and 4. A slidable control member 5 is accommodated in the passage 2 and is urged in the direction towards the plug 3 by spring 6 which is also accommodated in the bore 2 and which bears upon the plug 4 and the control member 5, respectively.

FIG. 1 shows clearly that the control member 5 is provided with two transverse bores 7 and 8. A longitudinal bore 9 extends from the transverse bore 7 to one axial end face 5'' of the member 5, and a similar longitudinal bore 10 extends from the transverse bore 8 to the opposite axial end face 5'.

Reference numeral 11 identifies an inlet channel which communicates with the diagrammatically illustrated source of pressure fluid as well as with the passage 2. A further channel 11' constitutes one outlet which also communicates with the passage 2 and with a diagrammatically illustrated user device. Finally, there is also provided a channel 12, a further outlet channel, communicating with the passage 2 and with a diagrammatically illustrated additional user device.

The generally cylindrical member 5 is provided in its outer circumference with a suitable recess which forms with the inner circumferential wall bounding the passage 2 an annular space 13 communicating with the channel 11'. A similar recess, axially spaced from the first-mentioned one, defines with the circumferential wall bounding the passage 2 an additional annular space 14 communicating with the channel 12.

The housing 1' is provided with an additional passage extending at least in substantial parallelism with the passage 2 and identified with reference numeral 15; it will be seen that the passage 15 is stepped and has opposite open ends which are closed by restrictive threaded plugs 16 and 17. One section 18 of the passage 15, resulting from the stepped configuration of the latter, accommodates slidably a throttling piston 19 which is urged by a spring 20 in the direction towards the plug 17, with the spring 20 being located in a section 21 of the passage 15 and bearing upon the plug 16 and the facing end of the piston 19, respectively. A larger-cross-section portion of the bore 15 defines an annular space 22 about the piston 19 and bounded by a control edge 23 which together with the piston 19 defines a throttling location. A channel 24 communicates the annular space 22 with the passage 2. An end portion of the piston 19, provided with the slots 25, extends into a portion 24' of the passage 15 which is adjacent the annular space 22 and a bore 26 extends to the space 21 accommodating the spring 20 and located between the piston 19 and the plug 16.

In addition, the passage 15 is provided with a portion or section 27 into which a journalling element 28 is screw-threadedly inserted, being formed with an axial passage in which a pin 29 is slidably guided. Provided on the pin 29 is a piston 30 which is guided in a passage portion 27' and an extension 31 of which abuts against an eccentric 32 which can be manually adjusted, with the spring 20 permanently urging the piston 19 against the facing end of the pin 29 so that any movements of the latter are shared by the piston 19.

Between the portion 24' and the portion 27 there is located an annular space 33 which communicates via a channel 34 with the passage 2, with an additional bore 35 extending from channel 34 to the space 36 accommodating the eccentric 32, for pressure equalization purposes.

The housing 1' is additionally provided with an inlet port 37 which communicates with the portion 27' via a channel 38, and the portion 27' further communicates via a channel 40 with an outlet port 39.

A source of pressure fluid, diagrammatically illustrated, communicates with the inlet 11 so that a stream of fluid passes from the inlet 11 via the bore 8 and the channel 24 into the annular space 22. With the use of the eccentric 32 the throttling piston 19 is displaced via the pin 29 towards the left to a desired extent, whereby as a result of this pressure fluid can pass along the slots 25 from the space 33 into the channel 34 via a control bevel 43 provided on the member 5 into the annular space 13. From here the stream, namely the main stream flows via the outlet 11' to the diagrammatically illustrated first user device.

Via the bores 7–10 in the control member 5 pressure fluid also flows to the opposite end faces 5' and 5'' of the member 5. When the stream of pressure fluid flowing through the valve has reached a certain value, then the pressure acting upon the end face 5' exceeds the pressure acting upon the end face 5'', including the pressure exerted by the spring 6, displacing the member 5 slightly towards the right. When this movement takes place, pressure fluid can pass via a control bevel 44 from the channel 24 into the annular space 14 and from there via the outlet 12 to the diagrammatically illustrated second user device. In operation of this valve, the throttling piston 19 is used to select a setting at which a main pressure fluid flow of desired parameters will pass through the valve and leave via the outlet 11'. The setting is accomplished via the eccentric 32 which can be adjusted from the exterior of the housing. When the stream of pressure fluid arriving at the inlet 11 from the diagrammatically illustrated source of pressure fluid is greater than the main stream selected via the throttling piston 19, that is the stream which is to leave through the outlet 11', then the excess fluid is shunted as a secondary stream via the outlet 12 to a second diagrammatically illustrated user device.

In operation, the control member 5 will constantly perform sliding control movements, in order to compensate for variable flow or pressure fluctuations which occur. To this extent, the operation of the valve is known from the prior art.

Contrary to the prior art, however, the present invention makes it possible to vary the main flow (through the outlet 11') according to any desired characteristics or parameters, independently of the once-selected setting which has been chosen via the throttling piston and the eccentric. This is accomplished by means of a control flow of fluid derived from the diagrammatically illustrated source of control fluid. It can be derived from any desired source of pressurized control fluid which will enter at the inlet port 37 and exert a pressure upon the piston 30 of the pin 29 which effects the setting of the throttling piston 19. Depending on the pressure exerted by the control fluid, and consequently the displacement of the piston 30, pin 29 and throttling piston 19 towards the right, a main fluid flow to and out of the outlet 11' will be obtained which is greater or lesser.

Figure 2:
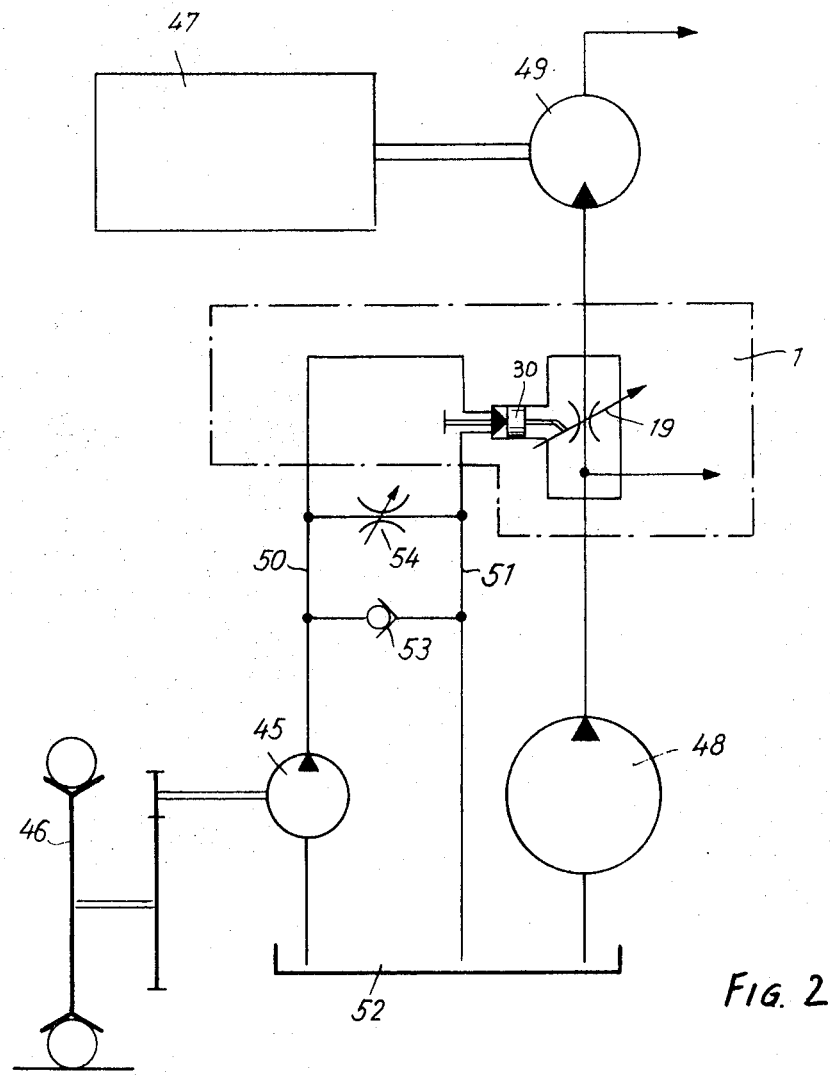
FIG. 2 is a diagrammatic illustration showing the application of the flow regulating valve of FIG. 1 in an agricultural combine.

In FIG. 2 we have illustrated an exemplary arrangement wherein the novel valve is incorporated in the power circuit for the winding reel 47 of an agricultural combine. Such combines are well known and their purpose and operation as well as construction is not believed to require detailed discussion. The source of control fluid may be, as in this illustrated example of use, a control pump 45 which is driven by the drive wheel 46 of the combine whose reel 47 has a number of rotations depending upon the speed of advancement of the combine. The reel 47 is driven in rotation by a main pump 48 which supplies pressure fluid via the interposed novel flow regulating valve 1 to a hydromotor or fluid motor 49.

The control flow of fluid supplied by the control pump 45 which in turn is driven by the diagrammatically illustrated wheel 46 of the combine (while there is only one shown it will be appreciated that there are several but of which only one drives the pump 45) constitutes the reference value for the adjustment of the flow regulating valve 1. The latter regulates the main fluid stream (corresponding to the one issuing through the outlet 11') flowing from the pump 48 to the hydromotor 49 in correspondence with such adjustment. The secondary fluid stream flows to another non-illustrated user.

Reference numeral 52 diagrammatically illustrates a fluid reservoir and reference numeral 50 a supply conduit communicating with the fluid reservoir 52, with the pump 45 and with the flow regulating valve 1 which in FIG. 2 is shown in chain lines. A return conduit 51 connects the valve 1 with the reservoir 52, and connected between the conduits 50 and 51 is a one-way relief valve 53 which opens only in direction from the conduit 51 to the conduit 50, but not in opposite direction. The purpose of the valve 53 is to avoid—for instance when the combine moves backwardly rather than forwardly—the development of a vacuum in the conduit 50 by reversing of the direction of rotation of the pump 45.

An adjustable throttling device 54 of conventional and well known contruction is interposed between the conduit 50 and the conduit 51, in order to obtain a linear pressure increase in dependence upon the number of rotations of the control pump 45.

It will be appreciated that the flow regulating valve according to the present invention, illustrated by way of an exemplary embodiment in FIG. 1 and shown incorporated in an exemplary application of use in FIG. 2, has all the advantages of the prior art and, in addition, permits adjustment of the valve setting in ways other than manually. Specifically, the manual setting can be changed by the control fluid admitted through the inlet port 37, and conversely the setting obtained by the operation of the control fluid can be varied manually. This greatly enhances the versatility and utility of the flow regulating valve according to the present invention.

It will be understood that each of the elements described above, or two or more together, may also find a useful application in other types of constructions differing from the types described above.

While the invention has been illustrated and described as embodied in a flow regulating valve for pressure fluids, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims.

We claim:

1. A flow regulating valve for pressure fluids, comprising a housing having an inlet and two outlets for pressure fluid, and a bore communicating with said inlet and said outlets; a first source of pressure fluid for supplying fluid under pressure to said inlet; a slidable control member in said bore and having differential pressure faces; first passage means communicating said pressure faces with said inlet, so that the differential pressure faces are exposed to differential pressures exerted upon them by said pressure fluid, resulting in movement of said control member to a position in which the latter divides the flow of fluid entering said inlet into a main and a secondary stream which are channelled from said inlet via said bore to one of said outlets; adjustable throttling means in said housing and communicating with said bore and said first passage means for adjusting the pressure acting upon one of said pressure faces, said throttling means comprising a throttling member movable toward and away from an end position, and biasing means permanently urging said throttling member to said end position; operator-controlled varying means for varying the position of said throttling member so as to select a desired setting at the will of an operator; and pressure-fluid operated control means associated with said throttling means and said varying means and being operative for varying the position of said throttling member independently of the respective selected setting in dependence upon a control pressure governed by a reference value, said control means comprising an inlet port communicating with and receiving a stream of control fluid under pressure from a source of control fluid, second passage means in said housing, a piston slidably mounted in said second passage means between and in motion-transmitting relation to said throttling member and said varying means and having two sides one of which is at least in part exposed to said stream of control fluid, and third passage means connecting said second passage means with said bore and with one of said outlets in dependence upon the position of said piston in said second passage means.

2. A valve as defined in claim 1 said second source further comprising a control pump associated with said control means and operative for supplying pressure fluid to said inlet port, said control pump supplying quantities of pressure fluid which vary in dependence upon said reference value.

3. A valve as defined in claim 2, said second source; further comprising a pressure-fluid reservoir, supply conduit means connecting said reservoir with said control pump and the latter with said inlet port, and return conduit means connecting said housing with said reservoir.

4. A valve as defined in claim 3; and further comprising an adjustable throttling device interposed between said supply conduit means and said return conduit means.

5. A valve as defined in claim 3; further comprising a one-way relief valve connecting said supply conduit means with said return conduit means and operative for permitting the flow of fluid only from the latter to the former.

6. A valve as defined in claim 1, said varying means comprising an eccentric element in said housing and acting upon said one side in a sense displacing said piston counter to said biasing means to a desired setting.

7. A valve as defined in claim 6, said varying means comprising an operating portion accessible at the exterior of said housing and acting upon said eccentric element.

8. A valve as defined in claim 7, wherein said operating portion comprises a threaded element.

* * * * *